Feb. 25, 1958 YOSHICHIRO YASUDA 2,824,749
STEERING MECHANISM FOR PRODUCING DIFFERENTIAL STEERING
ANGLES FOR TWO OR MORE STEERABLE WHEELS
Filed Jan. 24, 1955 7 Sheets-Sheet 1

INVENTOR
Y. YASUDA
BY Robb & Robb
ATTORNEY.

INVENTOR
Y. YASUDA
BY
ATTORNEYS

United States Patent Office 2,824,749
Patented Feb. 25, 1958

2,824,749

STEERING MECHANISM FOR PRODUCING DIFFERENTIAL STEERING ANGLES FOR TWO OR MORE STEERABLE WHEELS

Yoshichiro Yasuda, Nakano-ku, Tokyo, Japan

Application January 24, 1955, Serial No. 483,684

4 Claims. (Cl. 280—87)

This invention relates to improvements in or relating to steering mechanism for vehicles and vehicles with trailers running on street, cross-country and on rail, for effecting turning in all wheel positions with geometrically accurate turning angles.

The object of this invention is to provide an ideal steering mechanism for such vehicles enabling turning to all wheel positions with geometrically accurate wheel turning angles.

Vehicles for street, cross-country and rails, for example commercial and industrial vehicles, also self-propelled and towed agricultural machines require specific conditions regarding the steering, particularly the steering knuckles in order to fulfil divers accuracy requirements and applications. A most important condition, especially in turning movements is to obtain the ideal, unrestricted rolling motion of the wheels on the path being travelled. The requirements of corresponding mathematical laws between the so-called turning angle, the chassis dimensions such as wheel-base, distance of the steering pivot centers from the vehicle center axis have caused considerable difficulty in the realization of the best kinematic transmission mechanism and resulted in a solution that either, is only a compromise approach, or resulted in a practically useless mechanism for the requirements of a geometrically accurate control at all radii from the center of curvature.

This invention makes possible by a new embodiment of the basic geometric figures and utilization of new geometric concepts and introduction to new conversion principles of the basic steering mechanism, maintenance of the mathematically accurate requirements of unrestricted rolling motion of all wheels at all turning radii encountered in travelling along a curve.

The invention not only concerns steering mechanisms for self-propelled vehicles of all types, but also includes steering mechanisms for trailer-steering, controlled from the towing vehicle. It also provides steering mechanisms for cross-country travel i. e. universal movement.

For a better understanding of this invention, reference is taken to the accompanying drawings, in which Figure 1 is a somewhat diagrammatic view of one form of steering mechanism according to this invention.

Figure 1:
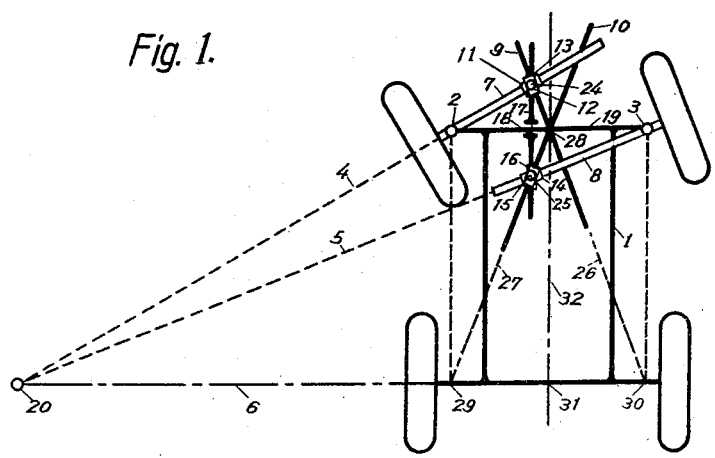
Figs. 1a to 1c are explanatory diagrams of the diagram shown in Fig. 1.

The mechanism diagrammatically illustrated in Fig. 1, shows the geometric principles of the basic steering mechanism developed in accordance with this invention and also the steering mechanisms that may be derived by means of new methods.

The axes 4 and 5 of the wheels which are supported in the steering pivots 2 and 3 respectively located at the chassis frame 1 of the four wheeled vehicle shown must intersect with the fixed axis 6 passing through the co-axis of the rear wheels at the point 20 in case of turning along a curve of a suitable radius such as 20–31, according to the kinematic requirement.

Figure 5:
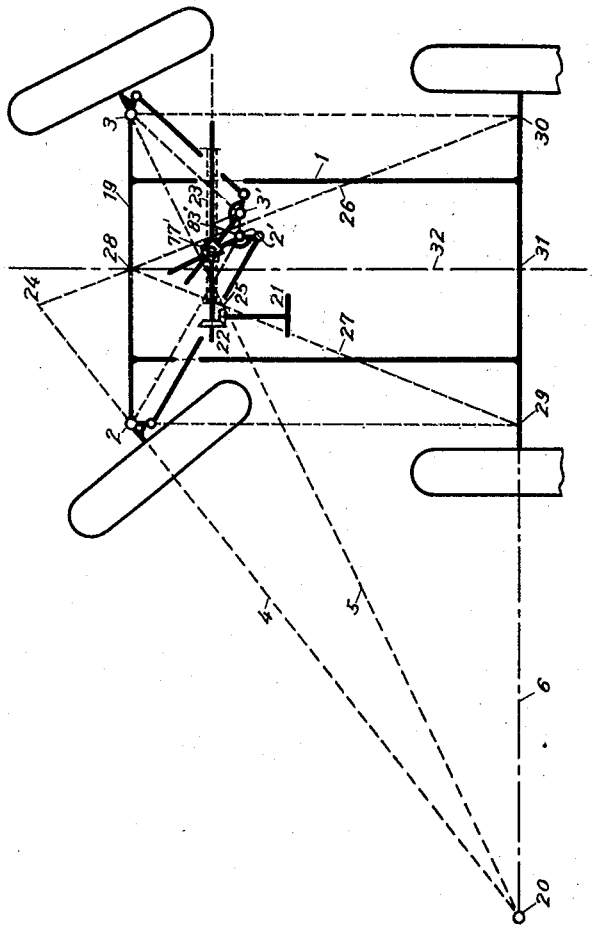
Figure 5 is a view showing a spindle-drive for front-wheel steering units of a four-wheeled vehicle in accordance with Figure 1 using proportional reduction.

According to the invention, this is achieved by the mechanism diagrammatically shown in Fig. 1, in that slide guide 17 is moved as a carrier on axis 19 in the direction of the steering pivot centers 2 and 3, by means of connecting rod 18 i. e. from steering unit 21 Fig. 5, through bevel-gears 22, by a screw spindle 23 Fig. 5. Bushes 12 and 15 move along the guide ways 9 and 10, which are secured on the vehicle frame 1. The bushes are connected by swivels, with additional slide bushes 11 and 13, 14 and 16 on pivot pins 24 and 25 respectively. Slide bushes 11 and 14 are moved along the guide bars 7 and 8, as bushes 13 and 16 are moved by the carrier.

According to the invention, the axes of slide guide ways 9 and 10 coincide with the straight lines 26, 27 respectively passing through the middle point 28 of the axis connecting pivots 2 and 3 and through the fixed points 29 and 30 of the vehicle frame 1. Whereas points 29 and 30 are located on the fixed axis 6, and 2, 3, 30, 29 form a rectangle, and the points 29 and 30 indicate the points of intersection of prependiculars from the centers of pivots 2 and 3 to the fixed rear axle. The fixed axis may be selected from a perpendicular which is normal to the longitudinal central axis of the vehicle frame. In the example shown, the fixed axis coincides with the rear axle.

When the rear wheels must also be steered said fixed axis can be suitably located at a desired position outside of the rear axis.

For the derivation of the geometrical relations of the steering mechanism according to this invention, as well as, for the hereinafter described principle of proportional-reduction in connection with some rotation in the arrangement of geometrical parts of the basic diagram, as well as, the reduction factors related hereto, the following symbols are of utmost importance.

$m$ = the distance of the steering pivot of each axle from the longitudinal center-line of the vehicle, in Fig. 1, also the distance of the points 2 and 3, from the longitudinal center-line of vehicle.

$l$ = the distance of the pivot centers from the selected fixed axis.

$r$ = the radius of curvature that is to be travelled, in Fig. 1, represented by the distance 20 to 31, at the intersection of the fixed axis with the longitudinal center-line.

$p$ = the distance of the carrier 17 from the longitudinal center-line, i. e. distance of the slide-bush pivots 24 and 25 from the longitudinal center-line.

$q$ = the perpendicular distance of the slide-bush pivots 24 and 25 from the axis 19.

Figure 1A:
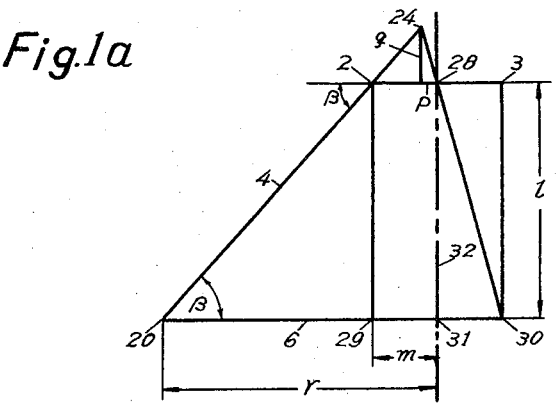
Figure 1B:
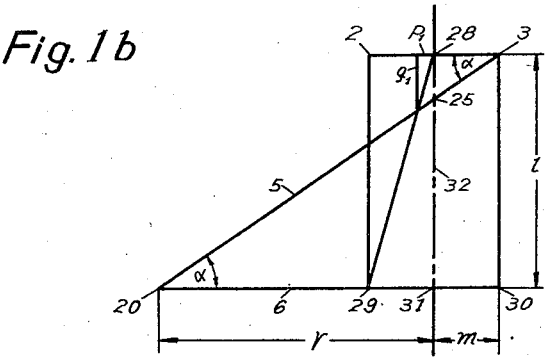
Figure 1C:
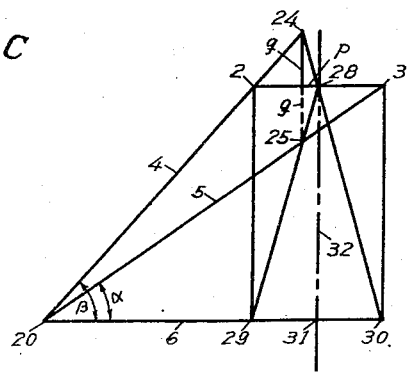

In order to explain more clearly the mechanism shown in Fig. 1, the geometrical arrangements of the figure are shown diagrammatically in the following additional drawings, in which Fig. 1a shows the geometric determination of values $m$, $l$, $r$, $p$, $q$ for the left front wheel;

Fig. 1b explains the geometric determination of values $m$, $l$, $r$, $p_1$, $q_1$ for the right front wheel, wherein the determination of values $p$, $q$ are added to simplify the proof analysis of index $l$; and Fig. 1c shows the combination of Figs. 1a and 1b to a single figure, with the exception that the mechanical parts such as, slide bushes 11, 12, 13 and 14, 15, 16 and slide guide 17 have been omitted.

For the determination of values $p$, $q$, of Fig. 1a and $p_1$, $q_1$ of Fig. 1b it is now possible, as Fig. 1c shows, to establish proof that, $p_1=p$, $q_1=q$, and in addition, further relations between the basic values $m$, $l$, $r$, $p$, $q$ may be derived, including the wheel steering angles $\beta$ and $\alpha$, which are shown in Figs. 1a, 1b, 1c and Fig. 1. With the aid of similar triangles and Fig. 1, the following relations are established:

$$\frac{q}{m-p}=\frac{l}{r-m}; \frac{q}{p}=\frac{l}{m} \qquad (1a, b)$$

and by combining:

$$p=\frac{m^2}{r}, \quad q=\frac{m\cdot l}{r} \qquad (2a, b)$$

by applying the relation of similarity of Fig. 1b—

$$\frac{q_1}{m+p_1}=\frac{l}{r+m}; \frac{q_1}{p_1}=\frac{l}{m} \qquad (1'a, b)$$

From both equations it follows that:

$$p_1=\frac{m^2}{r}; \quad q_1=\frac{m\cdot l}{r} \qquad (2'a, b)$$

The comparison of Equations 2a, b and 2'a, b proves the correctness of the statement $p_1=p$; $q_1=q$, and thereby the possibility of the construction of the basic steering mechanism for symmetrical steering of a coaxial wheel set in straight line travel in accordance with Fig. 1. In other words, the geometrically accurate transmission of the wheel steering angle, with the wheel axes 4 and 5 of the front wheels intersecting the fixed axis 6 of the rear wheels, at intersection point 20 is effected.

Maintaining the condition $p_1=p$ and $q_1=q$, is accomplished in Fig. 1, by means of guide 17 acting as a carrier cooperating with the guide rods 9, 10 and the corresponding slide sleeves 12, 15 in conjunction with the further slide guides 13, 16 on carrier 17 and by the other slide guides 11 and 14 on the wheel axles 7, 8 having the axes 4, 5.

For the wheel turning angle $\alpha$ and $\beta$ of Figs. 1a, 1b, 1c, the following equation is valid:

$$\text{cotangent } \alpha=\frac{m+r}{l}; \text{ cotangent } \beta=\frac{r-m}{l}$$

and the familiar equation:

$$\cot \alpha - \cot \beta = \frac{2m}{l} \qquad (3)$$

Figure 2:
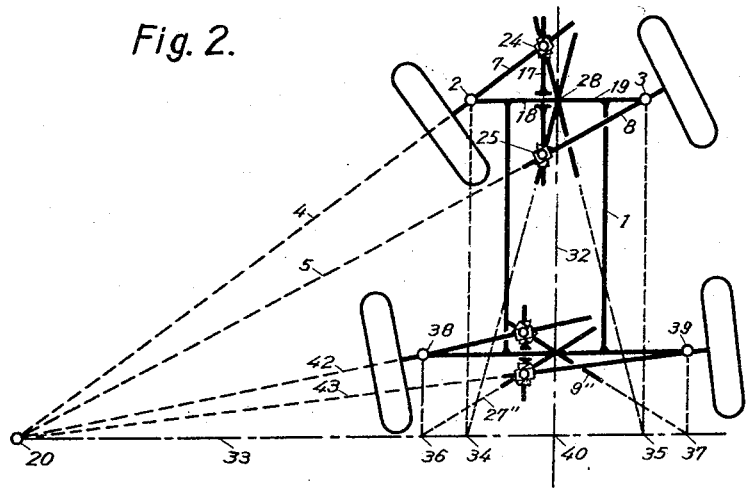
Fig. 2 is a somewhat diagrammatic view of a steering mechanism for individual steering of all wheels of a four-wheeled vehicle with any fixed axis.

The adaptation of the invention to four-wheel steering as in Fig. 2, is based on the selection of an optional perpendicular 33 to the longitudinal center-line of the vehicle as a fixed axis, wherein points 29 and 30 of Fig. 1 correspond to the points 34 and 35 of the front wheel steering and points 36 and 37 correspond to 38 and 39 for steering the rear wheels about the pivots. Points 36 and 37 are the intersection points from the perpendiculars of the steering-knuckle centers 38 and 39 of the rear wheels with the fixed axis 33. The wheel axes 4, 5, 42, 43 intersect each other at a point 20 on the fixed axis, a condition that is satisfied according to the invention, at all radii represented by the distance 20 to 40 in accordance with the steering geometry of the basic steering mechanism.

Figure 3:
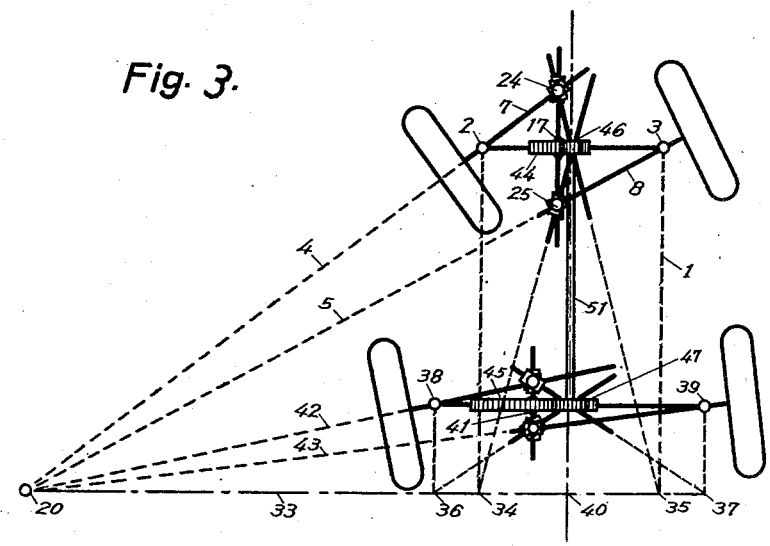
Fig. 3 is a similar view to Figure 2.

The basic steering mechanism coupling between the front and rear wheels is omitted in Fig. 2. This is illustrated in Fig. 3. The carriers 17 and 41 are moved on their respective steering pivot center connecting axes by means of the rack gears 44 and 45 and by the pinion gears 46 and 47 which are on a common shaft. The gear ratio is determined by the dimensions of the four-wheeled vehicle and the desired turning radius.

Figure 4:
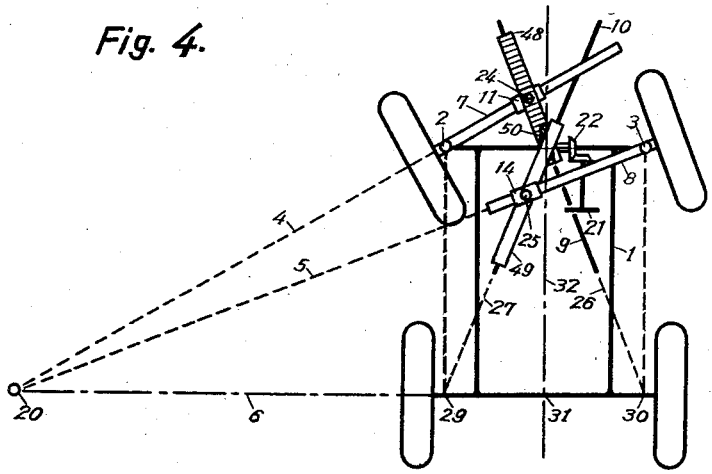
Figure 4 is similar to Figure 3 with additional parts of the basic steering mechanism of Figure 1.

A modification of the basic steering mechanism of Fig. 1 is shown in Fig. 4. This illustrates the means of effecting movement of bushes 12 and 15 Fig. 1, along the guide ways 9 and 10. Rack gears 48 and 49, in this construction, move along the guide ways 9 and 10. The slide bushes 11 and 14 are rotatably connected to the racks by the pivots 24 and 25 and slide along rods 7 and 8 and thereby create the geometrically accurate turning angle when the racks 48 and 49 engaged with the spur-pinion 50 are moved by the bevel gear arrangement 22 by means of steering unit 21, in the line of the axes 26 and 27.

When two constructions of the steering mechanism of Fig. 4 are applied to four-wheel steering—similar to Fig. 3—both mechanisms may be coupled with a similar shaft 51, with the transmission ratio corresponding to the dimensions of the vehicle in question.

The invention includes modified constructions of the basic steering mechanism of Fig. 1, as well as, the steering units of Figs. 3, 4, or 5, derived from Fig. 1. Such units shall be referred to as "steering units" in the following description. The advantage of the proportional-reduction linkage unit is among others, that these "steering units" may be placed anywhere within the vehicle frame 1.

The shifting of the wheel steering angle can be carried out by means of well-known parallel-link-drive.

The reduced scale identity between the triangles 2', 3', 83' and 29, 30, 28 of Fig. 5, proves the correctness of the steering geometry. The steering unit of Fig. 5 provides a really practical steering mechanism, thereby fulfilling the purpose of the invention.

Referring to Figure 5, the triangle 24, 2, 28 is turned about the point 28 counterclockwise for an angle of 24, 28, 2 and the turned triangle 24, 2, 28, is transferred in parallel to bring the apex 2 to the position of 2', then the turned and transferred triangle 24, 2, 28 is proportionally reduced according to the ratio represented by the length of the lines and in proportion thereto $$\frac{83'-2}{28-2}$$

so that triangle 24, 2, 28 will be turned, shifted, and reduced to the triangle 77', 2', 83'. Similarly the triangle 25, 2, 28 is turned about the point 28 clockwise for an angle of 25, 28, 3 and the turned triangle 25, 2, 28 is shifted, in parallel to bring the apex 3 to the position of 3', and turned and shifted and the turned and shifted triangle 25, 3, 28 is reduced proportionally according to the ratio represented by the length of the lines and in proportion thereto $$\frac{83'-3'}{28-2}$$

so that the triangle 25, 3, 28 will be turned, shifted and reduced to the triangle 77', 3', 83'.

Because of the geometrical relation between the triangle 24, 2, 28, and the triangle 77', 2', 83', the angle 24, 2, 28, equals the angle 77', 2', 83' and similarly the angle 25, 3, 28 equals the angle 77', 3', 83', and instead of shifting two pivots 24 and 25, we need only to shift one by a nut at 77' along a slide guide by manipulation of the handle 21 and the bevel gears 22 driving a shaft lying along the line 82'. The obtained angle 77', 2', 83', will be exactly transmitted to the pivot 2 by parallel link mechanism as shown in Figure 5.

Similarly the angle 77', 3', 83' will be exactly transmitted to the pivot 3 by the parallel link mechanism shown in said Figure 5.

Figure 6:
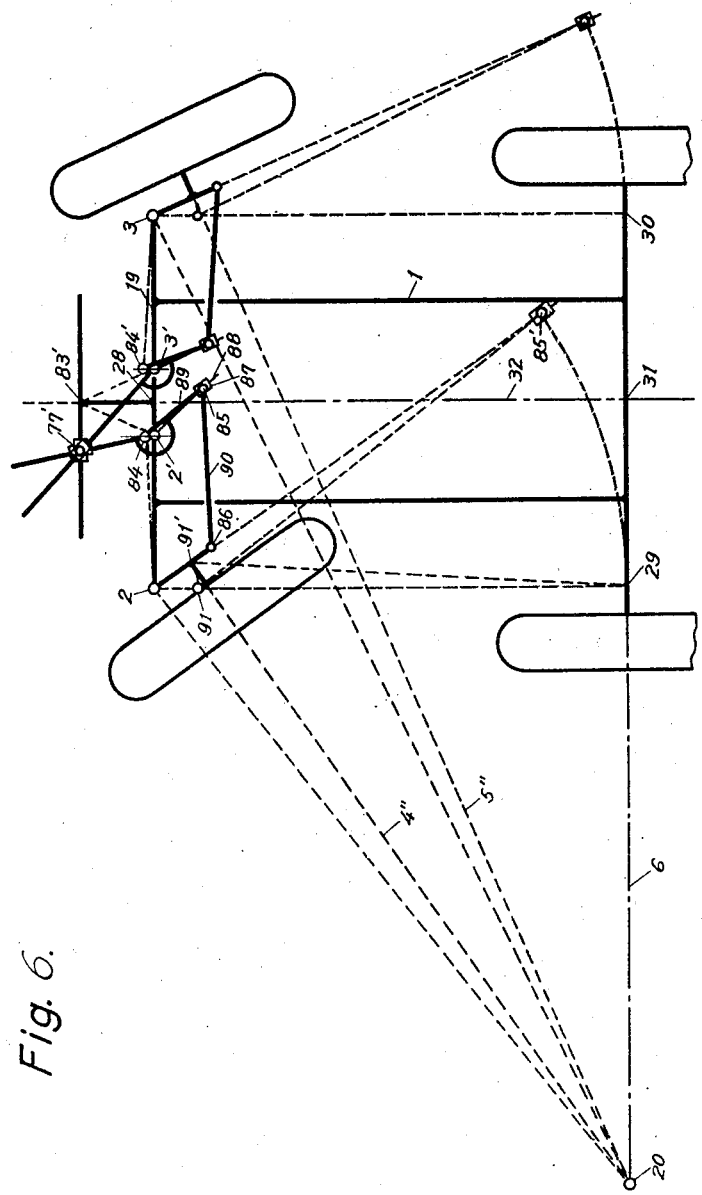
Figure 6 is a view showing the front wheel steering of a four-wheeled vehicle with trailing front wheel supension.

The application of the steering arrangement of Fig. 5, to the steering mechanism of Fig. 6, also permits geometrically accurate steering of vehicles with trailing wheel suspension. In such a case the extended wheel axes 4" and 5" do not intersect the center lines of the axle journals 2 or 3 respectively. The levers 88, 89 rotate about pivots 84 and 2' of the vehicle frame 1, and are connected by the guide bush 87 to pivot 85. The center distance of pivots 84 and 85 is equal to the center to center distance of pivots 2 and 86 and in addition, the link 90 is the same length as the distance between pivots 2 and 84. The position of pivots 84 and 84' outside of the steering pivot connecting axis 2 to 3 is determined by the reduction factor of the figure. For the right front wheel, the corresponding order of positions is valid. The similarity of triangles 2, 91, 85' and 84, 2', 85 is to be observed, in which the distance 2 to 91 is equal to the amount of trail represented by the distance 2 to 91'.

Figure 7:
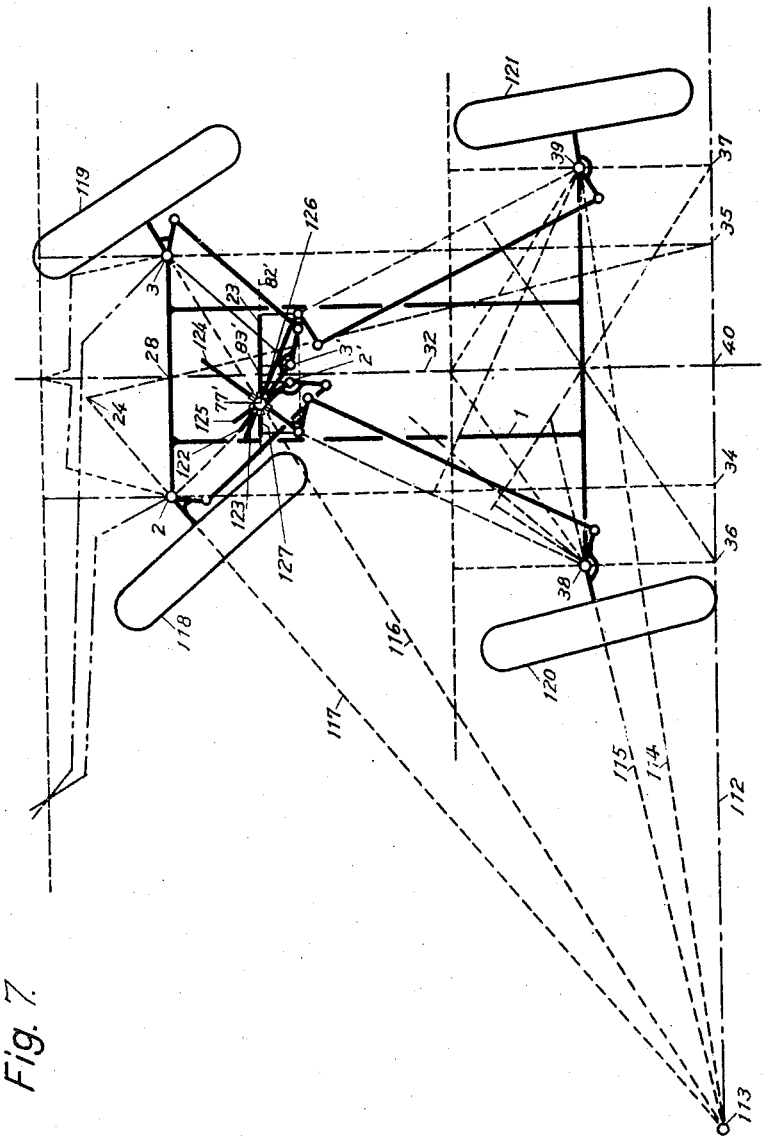
Figure 7 is a view showing a four-wheel steering mechanism created by combining two steering units of the Figure 6 type.

Thus Figure 7 illustrates a 4-wheeled steering system, with an optionally selected fixed axis 112 and center of curvature 113, the axes 114 to 117 intersecting it. For the two front wheels 118 and 119 and the two rear wheels 120, 121, one steering unit each is fitted, and the units are coupled together for operating corresponding off-set knuckle joints by parallel link units.

A further example of this invention as applied to a four-wheeled steering system is shown in Fig. 7, in which the steering units required for the front wheels 118 and 119 and the rear wheels 120 and 121 are combined into one single unit. The two steering units are in this case developed in the manner of Fig. 5, and modified by means of reduction factors so that the guide rods 122, 123, 124, 125, that actuate the steering, are guided along the guide path 127 by means of a carrier and pivot 126 and the guide bush connected to it, for example, by means of screw spindles. By combining the steering units in this manner, savings of construction components and also simplification of the entire steering mechanism is achieved. The transmission of the wheel turning angle by means of parallel linkage shown on the steering knuckles is not shown in Fig. 7 in detail, since its operational function is easily understood.

Figure 8:
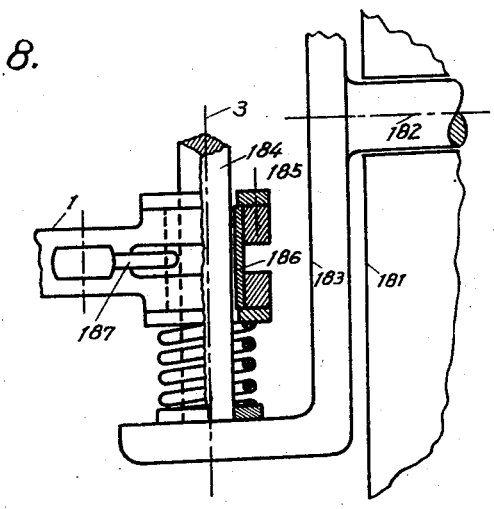
Figure 8 is a detail view showing wheel journal suspension.

The direct installation possibilities of the first developed "plane steering" basic steering mechanism in vehicles for universal steering duty, i. e. cross-country, on streets with depressions etc., is illustrated in Fig. 8.

The herein shown sleeve guide of the front wheel 181 of a four-wheeled vehicle, i. e. motor vehicle, shows that the slide guide 183 is normal to, and fixed to wheel axle journal 182 of the front wheel 181, for instance with a rectangular guide bar 184, which moves in the rectangular sleeve 186 in the bush 185 and pressed resiliently against steering knuckle 187 by a coil spring so as to form a telescopic shock absorber, thereby overcoming differences in the height of the contact surface of the road, without affecting the "plane" basic steering mechanism, or steering unit, fixed in the vehicle frame 1. The difference in comparison to the ideal "plane" steering consists merely of extending the connection axis through the surface contact point of the steered wheel and the point of break-off, of the steering axis center line 3 with the road surface, always intersecting the determined vertical at various heights of the axis of the center of curvature, instead of intersecting at the same point.

On vehicles employing a joint cross shaft axle or parallelogram steering suspension of the front wheels, the basic steering mechanism or steering units may also be applied, in accordance with the invention and in such a manner that, they become part of the complete steering mechanism and that the geometrically accurate, determined steering angle, that is thereby related to certain inclined or projected planes, is transmitted to the steering pivot, angularly true, by means of universal construction mechanisms and universal joints.

Thus, when employing a joint cross shaft axle, the steered front wheels which roll on a plane that intersects the plane, on which the non-steered rear wheels roll, on the center line of the vehicle frame at a determined angle, the connecting axes, as mentioned in relation to the telescopic shock absorbing sleeve guide, meet at a point through the surface-contact-point of the wheel that is steered and through the break-off point of the steering pivot axis with the path being travelled, which lies in the center of curvature at a right angle erected to the contact plane of the rear wheels, provided that the geometrical steering conditions of plane steering are changed accordingly so that, the ideal radius of curvature is dependent on the actual radius of curvature and additionally dependent on the above mentioned angle of inclination of both planes and also on the wheel diameter and this dependency is effected by mechanical means.

What I claim is:

1. In steering mechanism of the class described, in combination, a vehicle frame, a steerable wheel connected thereto, an arm connected to the wheel for moving the same, steering means carried by the frame comprising a transversely extending guide member, a slide carrier mounted thereon for movement therealong from side to side of the vehicle frame, said slide carrier extending at an angle away from the guide member, a guide part fixed to the frame, extending at an angle longitudinally thereof, and a common connection to cause simultaneous movement of the slide carrier, and the arm, said connection moving along the carrier, the arm, and the guide part, means being provided to move the carrier from side to side of the vehicle frame.

2. In steering mechanism of the class described, in combination, a vehicle frame, a steerable wheel connected thereto, parallelogram linkage connected to the wheel and the frame for turning the wheel, an arm on the frame for moving the linkage, drive means for the arm comprising a member slidably engaged therewith and drivably connected to a transversely extending operating member, and connections for causing movement of said operating member.

3. In steering mechanism of the class described, in combination, a vehicle frame, steerable wheels connected thereto at opposite sides for simultaneous but different distances of angular motion, an arm connected to each wheel for moving the same, a transverse guide member, a carrier movable on said member, guide parts, said guide parts consisting of elements aligned with the center point of the guide member and the intersection of perpendiculars projected from the points about which the wheels are steered to the fixed axis about which the vehicle as a whole is to move, and slide parts engaging the arm, carrier, and guide part whereby movement of the carrier will cause movement of the said slide part and, means for moving said carrier.

4. In steering mechanism of the class described, in combination, a vehicle frame, steerable wheels connected thereto, a steering arm for each of said wheels, a slide part engaging and movable along each of said arms, a rack member connected to each slide part and arranged in alignment with the intersections of a line extending at right angles from the steering axis of the wheels to the longitudinal axis of the vehicle, and the intersections of perpendiculars projected from the steering axes with the fixed axis about which the vehicle as a whole is steered, and means to move said rack members.

References Cited in the file of this patent
UNITED STATES PATENTS

| | | |
|---|---|---|
| 1,871,432 | Fageol | Aug. 9, 1932 |

FOREIGN PATENTS

| | | |
|---|---|---|
| 451,813 | Great Britain | Aug. 12, 1936 |
| 529,684 | Great Britain | Nov. 26, 1940 |